(12) United States Patent
Miyamoto et al.

(10) Patent No.: US 7,254,492 B2
(45) Date of Patent: *Aug. 7, 2007

(54) METHOD OF COMPUTING ENERGY LOSS GENERATED IN VISCOELASTIC MATERIAL AND METHOD FOR EVALUATING ENERGY LOSS OF GOLF BALL BY USING METHOD OF COMPUTING ENERGY LOSS

(75) Inventors: Kazuyoshi Miyamoto, Hyogo (JP); Masaki Shiraishi, Hyogo (JP)

(73) Assignee: SRI Sports Limited, Kobe (JP)

( * ) Notice: Subject to any disclaimer, the term of this patent is extended or adjusted under 35 U.S.C. 154(b) by 412 days.

This patent is subject to a terminal disclaimer.

(21) Appl. No.: 10/681,278

(22) Filed: Oct. 9, 2003

(65) Prior Publication Data
US 2004/0073385 A1    Apr. 15, 2004

(30) Foreign Application Priority Data
Oct. 11, 2002    (JP)    ............................. 2002-298653

(51) Int. Cl.
*G06F 19/00*    (2006.01)
*G01N 19/06*    (2006.01)

(52) U.S. Cl. ......................................... 702/44; 73/783
(58) Field of Classification Search ................. 702/44; 73/866, 804, 787, 789; 703/2
See application file for complete search history.

(56) References Cited

U.S. PATENT DOCUMENTS 4,056,973 A * 11/1977 Prevorsek et al. ............ 73/789
5,458,002 A * 10/1995 Askea et al. .................. 73/789
6,202,496 B1* 3/2001 Jakob et al. .................. 73/866
6,519,536 B1* 2/2003 Brunacci et al. .............. 702/50
6,671,642 B2* 12/2003 Miyamoto et al. .......... 702/109
6,925,416 B2* 8/2005 Miyamoto et al. .......... 702/182

FOREIGN PATENT DOCUMENTS

JP    2002-055034 A    2/2002
JP    2003083874 A  *  3/2003

OTHER PUBLICATIONS

Chatti et al., Dynamic Finite-Element Analysis of Jointed Concrete Pavements, 1994, Transpotation Research Record, vol. 1449, pp. 79-90.*
Johnson et al., Quasi-Static Viscoelastic Finite Element Model of an Aircraft Tire, Apr. 1999, NASA/TM-1999-209141.*
Hermida et al., Internal Friction and Loss tangent of Nonlinear Viscoelastic Materials: Different Concepts, Different Results, 2000, Journal of Alloys and Compounds 310, pp. 280-283.*

* cited by examiner

*Primary Examiner*—Bryan Bui
*Assistant Examiner*—Toan M. Le
(74) *Attorney, Agent, or Firm*—Birch, Stewart, Kolasch & Birch, LLP

(57) ABSTRACT

A method of computing an energy loss generated in a viscoelastic material, including analyzing a dynamic behavior of a to-be-analyzed object composed of the viscoelastic material by a numerical analysis method; and computing the energy loss of the object momently when the object makes the dynamic behavior by a viscous component of the object. The energy loss computed by the energy loss computing method is visualized by a golf ball-hitting simulation to momently evaluate the energy loss generated in the golf ball.

4 Claims, 15 Drawing Sheets
(4 of 15 Drawing Sheet(s) Filed in Color)

US 7,254,492 B2

METHOD OF COMPUTING ENERGY LOSS GENERATED IN VISCOELASTIC MATERIAL AND METHOD FOR EVALUATING ENERGY LOSS OF GOLF BALL BY USING METHOD OF COMPUTING ENERGY LOSS

This nonprovisional application claims priority under 35 U.S.C. § 119(a) on Patent Application No(s). 2002-298653 filed in JAPAN on Oct. 11, 2002, which is (are) herein incorporated by reference.

BACKGROUND OF THE INVENTION

1. Field of the Invention

The present invention relates to a method for computing an energy loss generated in a viscoelastic material and a method of evaluating an energy loss of a golf ball by using the method of computing the energy loss generated in the viscoelastic material. More particularly, the present invention is intended to compute the energy loss generated in the viscoelastic material during its dynamic deformation behavior at regular intervals to improve analysis accuracy of the dynamic deformation of the viscoelastic material. In particular, the present invention is intended to evaluate the energy loss generated inside the golf ball when it is hit.

2. Description of the Related Art

A viscoelastic material represented by a macromolecular material such as rubber or elastomer is widely applied to various products such as tires, balls used in sport, rolls for printing machines.

To save cost and time required to make a trial manufacture, simulation is made in various industrial fields to develop various products composed of the viscoelastic material. For example, to estimate the restitution performance of a golf ball, the present applicant proposed a method of simulating actual hitting tests by an analysis using a finite element method, as disclosed in Japanese Patent Application Laid-Open No. 2002-55034.

To improve the restitution performance of the golf ball, in one proposal, attention is given to an energy loss generated inside the golf ball when it is hit. More specifically, when a hitting object impacts (collides with) the golf ball, the golf ball deforms and separates from the hitting object, thus generating a repulsion. It is known that the restitution coefficient of the golf ball at this time is greatly affected by the energy loss generated inside the golf ball in the collision between the hitting object and the golf ball. Investigations are made to compute the energy loss generated in an to-be-analyzed object (hereinafter referred to as to-be-analyzed object) such as the golf ball composed of the viscoelastic material by simulations.

More specifically, in the process where the viscoelastic material is subjected to a stress, generates a strain, and returns to its original state, there is a relationship (stress-strain curve) between the stress and the strain, as shown in FIG. 14. The curve of FIG. 14 indicating the relationship between the stress and the strain goes momently from a point O to a point A where the absolute value of the strain is maximum and returns to the point O. At that time, a difference (a portion shown with vertical lines) is generated between a work amount done while the curve goes from the point O to the point A and a work amount done while the curve returns from the point O to the point A. By using the value of the difference (area shown with vertical lines) between the above-described two work amounts, it is possible to find the energy loss generated in the viscoelastic material.

To find a difference L between the two work amounts, computations are performed to determine a sum total L1 (work amount indicated with vertical lines of FIG. 15A) of the work amount done during the movement of the stress-strain curve from the point O to the point A and a sum total L2 (work amount indicated with vertical lines of FIG. 15B) of the work amount done during the movement of the stress-strain curve from the point A to the point O.

The difference L (area shown with vertical lines in FIG. 14) between the two work amounts is computed by using the sum total L1 of the work amount done during the movement of the stress-strain curve from the point O to the point A and the sum total L2 of the work amount done during the movement of the stress-strain curve from the point A to the point O. The energy loss can be computed by the product of the value of the work amount difference L and the volume of each element in its initial configuration. As described above, in the conventional art, the energy loss is computed by using the area (loop area) in the stress-strain curve, called hysteresis loss, showing the relationship between the stress and the strain.

However, the above-described method computes the energy loss of a to-be-analyzed object at the time of termination of the dynamic deformation behavior thereof when the to-be-analyzed object almost converges its deformed state converges and returns to its original state. The energy loss of the to-be-analyzed object in the entire stages of its deformation behavior is sufficient for estimating the restitution performance of the golf ball. However, the energy loss computed momently during its deformation behavior can be utilized to evaluate a player's feeling when the player hits the golf ball in addition to the evaluation of the restitution performance.

In the case where the viscoelastic material does not return to its original state from its deformed state, the strain does not return to zero and the loop does not have a closed state in the above-described stress-strain curve. In this case, the above-described method of computing the energy loss by using the area of the loop is incapable of computing the energy loss. The above-described method is incapable of computing the energy loss unless an analysis finishes, thus being incapable of evaluating the energy loss in the course of the deformation.

SUMMARY OF THE INVENTION

The present invention has been made in view of the above-described problem. Thus, it is a first object of the present invention to provide a method of momently computing an energy loss generated in a viscoelastic material during its dynamic deformation behavior. It is a second object of the present invention to provide a method of evaluating an energy loss generated inside a golf ball when it is hit, by visualizing the energy loss momently.

To achieve the object, the present invention provides a method of computing an energy loss generated in a viscoelastic material, comprising the steps of analyzing a dynamic behavior of a to-be-analyzed object composed of the viscoelastic material by a numerical analysis method; and computing the energy loss of the object momently when the object makes the dynamic behavior by a viscous component of the object.

The energy loss of the viscoelastic material is generated by a viscous component composing the viscoelastic material. Accordingly, as a result of the present inventors' energetic studies, they have found that to compute the energy loss of the viscoelastic material, attention should be given to the viscous component of the to-be-analyzed object and that to compute the energy loss momently, the energy loss generated momently by the viscous component should be computed. Thus by giving attention to the viscous component obtained at a given time by a numerical analysis, it is possible to compute the energy loss generated momently by the dynamic deformation behavior without using the above-described stress-strain curve showing the relationship between the stress and the strain from the time when the to-be-analyzed object deforms until the time when it returns to its original state.

Therefore the method of the present invention is capable of separately computing the energy loss in a state in which the viscoelastic material has deformed and does not return to its original state, the energy loss at regular intervals in the course of the deformation, and the energy loss at a moment. Thus the method is useful in analyzing the dynamic deformation behavior of the viscoelastic material and designing the to-be-analyzed object.

It is preferable that the numerical analysis method is carried out by an analysis using a finite element method; and the energy loss is computed by using the value of a stress generated by viscosity of the viscoelastic material, when the object makes the dynamic behavior. When the to-be-analyzed object has a certain strain amount at a given time in the dynamic behavior of the object, the viscous component is present in the viscosity thereof and an elastic component is present in the elasticity thereof. The energy loss can be computed by using the value of a stress generated by the viscosity. It is preferable that the value of the stress generated by the viscosity is found by the viscous drag of the viscous component of the viscoelastic material and by the strain speed of the viscoelastic material at the time when the viscoelastic material makes the dynamic behavior.

The analysis using the finite element method is preferable for the above-described reason. In addition, the numerical analysis may be executed by using a finite difference method, a finite volume method, and a boundary element method.

More specifically, a time history change of the energy loss can be visualized in correspondence to the dynamic behavior of the to-be-analyzed object by momently computing the value of the stress generated by the viscous component for the to-be-analyzed object that draws a hysteresis loop in the stress-strain curve as shown in FIG. 1.

The viscoelastic material showing the stress-strain curve shown in FIG. 1 at the time when the viscoelastic material makes a dynamic behavior is modeled with a two-element Voigt material, shown in FIG. 2, composed of a spring indicating the elastic component and a dashpot, indicating the viscous component, arranged in parallel with the spring. In the stress-strain curve shown in FIG. 1, it is possible to compute the energy loss from the time when the to-be-analyzed object deforms until the time when it converges its deformation behavior and returns to its original state. However, at the time of an actual deformation behavior which occurs every moment, the energy loss occurs in the dashpot. The viscous work done by the dashpot is the energy loss. When the elastic component is constant, the relationship between the strain and stress of the elastic component is shown with the broken line, shown in FIG. 1, connecting a maximum strain value of $\epsilon_{max}$ and a strain value of 0 to each other.

Let it be supposed that the stress and the strain as shown in FIG. 1 are generated in the dynamic deformation behavior of the to-be-analyzed object. At that time, the stress generated every moment is expressed as shown below by using the elastic component and a viscoelastic component:

$$\sigma = E\epsilon + \eta(d\epsilon/dt)$$

where E is the modulus of elasticity of the elastic component, $\eta$ is the viscous drag of the viscous component, $\sigma$ is the stress, $\epsilon$ is the strain, and $d\epsilon/dt$ is the strain speed.

At this time, $\eta(d\epsilon/dt)$ or $\sigma - E\epsilon$ is the stress ((stress of the entire to-be-analyzed object)-(stress generated by elastic component)) generated by the viscous component. Therefore, the value of the energy loss can be computed as a change of a time series, when the value of the stress generated in the elastic component can be obtained momently or when the value of the stress generated in the viscous component can be obtained momently as shown in FIG. 1, i.e., if the viscous drag of the viscous component or the modulus of elasticity of the elastic component is found. Needless to say, the sum total of the energy losses generated momently is equal to the area (computed by the above-described conventional computing method) of the stress-strain curve at the time of the return of the to-be-analyzed object to the original state in its deformation, i.e., equal to the energy loss computed when the analysis finishes.

In numerically analyzing the dynamic behavior of the viscoelastic material of a model by the finite element method, it is necessary to obtain the value of the stress generated momently by the viscosity of the viscoelastic material, based on the modulus of elasticity of the elastic component of the model or the value of the viscous drag of the viscous component thereof. In the embodiment, a simple two-element Voigt model is exemplified as the model material. However, it is possible to use other models (a plurality of models including a viscous material), provided that the value of the stress generated by viscosity of the viscous material can be computed momently.

A viscoelastic model composed of a spring and a dashpot is preferable because the viscosity of the viscoelastic material is considered therein. By using such a viscoelastic model, the viscosity of the viscoelastic material can be simplified. Thus it is easy to consider the influence the viscosity gives to a deformation state of the viscoelastic material. For example, it is preferable to use a Maxwell model, a Voigt model, and a combination of a plurality of springs and dashpots as viscoelastic models in which the viscosity of the viscoelastic material is considered. A two-element model is preferable in view of simplicity of the model. Such a model composed of the viscoelastic material is used by varying the rigidity (vertical modulus of elasticity or horizontal modulus of elasticity) of the spring and the viscous drag of the dashpot.

It is preferable that as data of properties of the viscoelastic material that is used to analyze the dynamic behavior of the to-be-analyzed object, data obtained by measurement performed in conditions where the to-be-analyzed object is actually used. Thereby it is possible to execute analyses in correspondence to various deformation states of the actual viscoelastic material. It is preferable to set a measuring condition in supposition of a state in which the viscoelastic material has deformed because an external force is applied to a product made of the viscoelastic material being practically used. For example, if the product deforms greatly at a high speed, it is preferable to measure properties of the product with the split Hopkinson rod tester which will be described below.

In measuring the properties of a specimen with the split Hopkinson rod tester, the specimen can be strained greatly at a high speed. Therefore the properties of the material composing the golf ball can be measured in the condition (as fast as several seconds per 10000 or 1000 in speed and as large as several tens of percentages in deformation amount) of a strain, a strain speed, and a stress equivalent to conditions of a strain and a strain speed at the time when the golf ball is hit with an actual golf club head. The split Hopkinson rod tester is capable of measuring the properties of the specimen in regions of various strains and strain speeds by merely changing the collision speed of the hitting rod thereof that applies an impact to the specimen.

Conventionally, the split Hopkinson rod tester is used to evaluate the impact behavior of a metal material. In the present invention, the split Hopkinson rod tester is used by improving its construction to evaluate the viscoelastic material. The method of measuring the properties of the viscoelastic material with the split Hopkinson rod tester will be described later.

The viscoelastic material includes materials having viscoelasticity. For example, thermoplastic resin, thermosetting resin, elastomers, and rubber can be used singly or in combination as the viscoelastic material. Additives such as a colorant, a deterioration prevention agent, and a crosslinking agent may be added to these viscoelastic materials or to a mixture thereof.

The present invention provides a method of evaluating an energy loss of a golf ball composed of a viscoelastic material, comprising the steps of analyzing a dynamic behavior of the golf ball in supposition of a collision between the golf club head and the golf ball; computing the energy loss generated in the golf ball owing to the collision by using the method, of the present invention, of computing an energy loss generated in a viscoelastic material; inputting the energy loss to a visualizing software; and visualizing the energy loss momently.

By momently visualizing and observing the state of the energy loss generated inside the golf ball at the time of the collision between the hitting object and the golf ball, it is possible to grasp the state of the viscoelastic material when the viscoelastic material composing the golf ball makes a dynamic behavior. By momently visualizing the energy loss in the time period from an impact time until a time when the golf ball separates from the golf club head, it is possible to obtain information useful for allowing a player to have a good feeling when the golf club head impacts the golf ball. Thus the method is serviceable for designing the golf ball.

By meshing the golf ball which is analyzed in its dynamic behavior into a large number of elements and three-dimensionally visualizing and displaying the computed energy loss of each element, it is possible to estimate and observe a portion inside the golf ball in which the energy loss has been generated and also the extent of the generated energy loss. The energy loss means a deformation (hysteresis) loss of each component of each element.

As a method of realizing the visualization of the energy loss, a visualizing software "ensight" and the like can be used. This software allows energy losses generated in each ball-constituting element to be displayed in different colors in a view (contour view).

In visualizing the energy loss, a deformed configuration of the golf ball model may be displayed based on coordinate values of nodal points of each element. Thereby it is possible to visualize the energy loss of the golf ball and the configuration thereof at the time of the collision between the golf club head and the golf ball. Thus the method of the present invention is effective for designing the golf ball.

The golf ball is composed of the viscoelastic material and subjected to an external force such as an impact load when it is hit, thus being deformed at a high speed or to a high extent. It is preferable to use a material having properties measured in conditions in which its maximum compression strain is 0.05 to 0.50 and its maximum strain speed is 500/s to 10000/s and favorably 500/s to 5000/s, in supposition of a maximum compression strain and a maximum strain speed which the golf ball has, when the golf ball is hit with the actual golf club head. Since the method of the present invention is capable of correctly simulating the state of the strain and the stress to which the material composing the golf ball is subjected when the golf ball is hit, the method is capable of improving energy loss visualization accuracy.

The method of the present invention is capable of analyzing the dynamic behavior of a so-called one-piece golf ball consisting of a cross-linked rubber layer, a so-called two-piece golf ball composed of the cross-linked rubber layer and a cover covering the cross-linked rubber layer, and a so-called multi-piece golf ball composed of three or more layers.

The viscoelastic material is used as the material for the golf ball. Additives may be added to the viscoelastic material. That is, it is possible to use any kind of materials for the golf ball, provided that it is possible to measure the property thereof necessary for performing a numerical analysis such as an analysis using the finite element method.

More specifically, the following materials can be used for the golf ball: synthetic resin such as ionomer resin, polybutadiene (butadiene rubber), natural rubber, polyisoprene, styrene-butadiene copolymer, ethylene-propylene-diene copolymer (EPDM), and urethane rubber.

The following products are composed of the viscoelastic material whose dynamic behavior is analyzed: in addition to the golf ball, a rubber roller for use in a printing machine, a rubber belt, a tire, sporting goods such as tennis goods, golf goods, the sole of a shoe, and the like. The method of the present invention is applicable to products containing the viscoelastic material and other materials. For example, the method is applicable to a composite product containing the viscoelastic material and a metal material. The method is capable of estimating the performance of a portion of the product corresponding to the viscoelastic material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 shows a state of a model in a simulation, assuming that a hollow rod model made of aluminum collides with a golf ball model, in which

DETAILED DESCRIPTION OF THE PREFERRED EMBODIMENTS

The embodiments of the present invention will be described below with reference to the drawings.

Detailed description is made below on a method of evaluating the energy loss of a golf ball by using a method for computing an energy loss generated in a viscoelastic material. The golf ball is used as a to-be-analyzed object composed of the viscoelastic material. The method of evaluating the energy loss of the golf ball dynamic comprises the steps of analyzing the dynamic behavior of the golf ball in supposition of a collision between a golf club head and the golf ball, momently computing the energy loss generated in the golf ball owing to the collision momently, inputting the computed energy loss to a visualizing software, and visualizing the energy loss of the golf ball momently.

Step 1:

A golf ball model is meshed into a large number of elements each having nodal points. The property of the material for the golf ball is inputted. A simulation is executed by an analysis using a finite element method, assuming that the golf club head collides with the golf ball to analyze the dynamic behavior of the golf ball model composed of the viscoelastic material. The amount of a strain generated in the golf ball model at the time of the collision is computed.

Step 2:

The strain, strain component, modulus of elasticity, viscous drag, strain speed, and coordinate values of nodal points of each element of the golf ball model are outputted. The value of a stress and a strain of each of six components of each element are computed momently.

Step 3:

The relationship between the stress and the strain of each component of each element is computed from the value of the stress and strain of each of the six components to momently compute an energy loss value of each element.

Step 4:

The computed energy loss values of all elements included in the golf ball model are inputted to the visualizing software to visualize the energy loss of the golf ball model momently. A deformed configuration of the golf ball model is also visualized from the coordinate value of each nodal point of the golf ball model.

At step 1, the golf ball model is meshed into a large number of elements each having the nodal points. The properties of the material of the golf ball are inputted. The simulation is executed by the analysis using the finite element method, assuming that the golf club head collides with the golf ball. The strain amount generated in the golf ball model at the time of the collision is computed.

Figure 3:
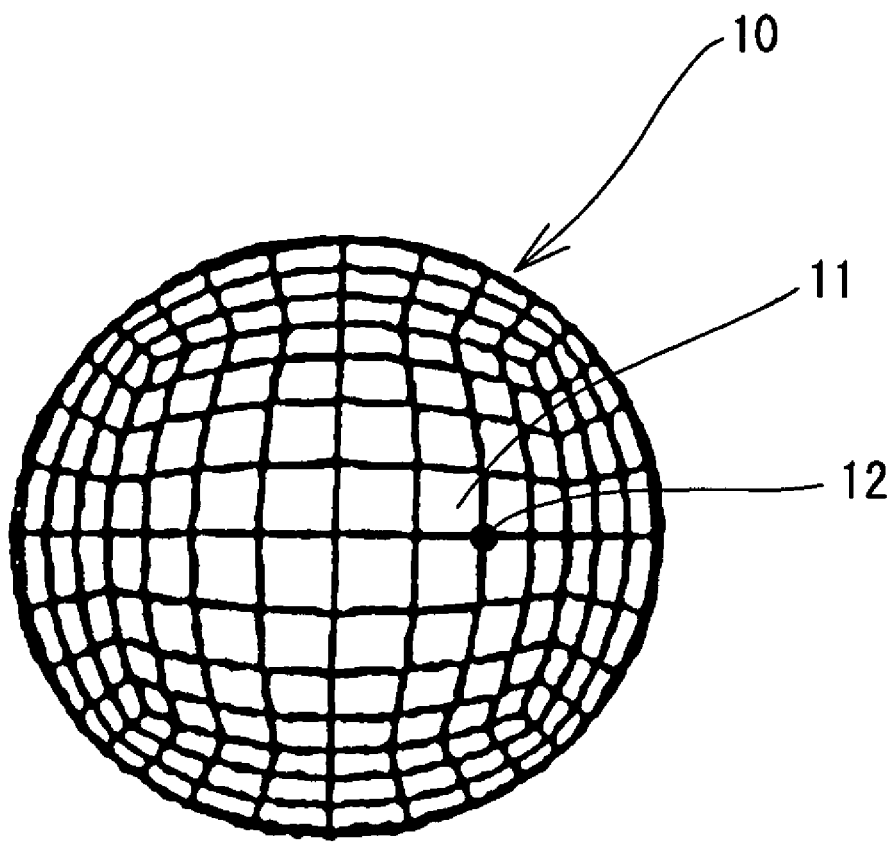
FIG. 3 is a schematic view of a golf ball model to be simulated.

FIG. 3 shows a golf ball model 10 to be simulated. As shown in FIG. 3, the golf ball model 10 is assumed to be a one-piece ball containing a urethane material as its main component. The diameter of the golf ball model 10 is set to 42.8 mm.

In executing the analysis using the finite element method, initial conditions of the golf ball model 10 are set. More specifically, the initial conditions such as the size, configuration, construction, and property, and the like thereof are set. Further the golf ball model 10 is meshed into a large number of elements 11 to obtain a large number of nodal points 12. In the embodiment, the golf ball model 10 is divided into 11600 elements 11. The element 11 is a hexahedron. The dimension of the element 11 is 1.25 mm to 5.62 mm. The volume of the element 11 is 1.95 mm$^3$ to 63.1 mm$^3$. The lines forming lattices shown in the drawings indicate meshes.

Based on the above-described set conditions, computations are performed to obtain the amount of the strain generated in the golf ball model 10 at a predetermined time after the time of the collision between the hitting object and the golf ball model 10.

A split Hopkinson rod tester which will be described later is used to measure the property of the material containing the urethane material as its main component. Thereby it is possible to obtain the properties of the material in conditions of a strain and a strain speed equivalent to conditions of a strain and a strain speed at the time when a golf ball is hit with the actual golf club head. The properties of the material are inputted to execute the simulation for the golf ball model 10 by the finite element method.

Figure 4A:
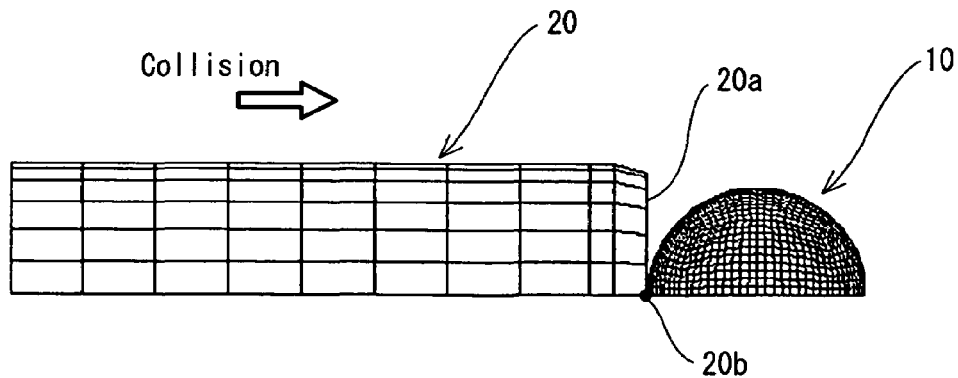
FIG. 4A shows a state before the hollow rod model collides with the golf ball model.
Figure 4B:
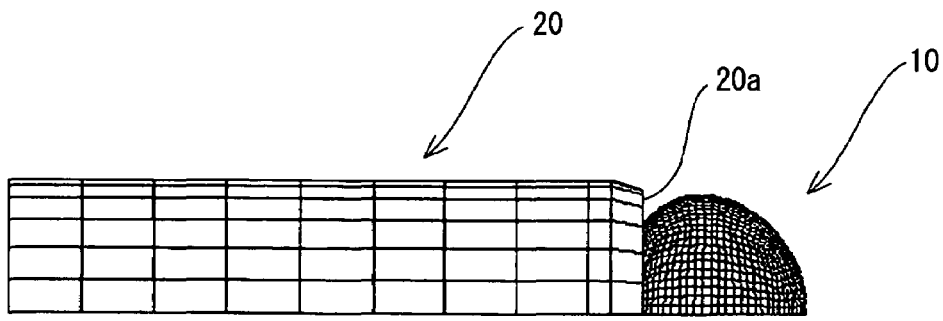
FIG. 4B shows a state when the hollow rod model is in collision with the golf ball model.
Figure 4C:
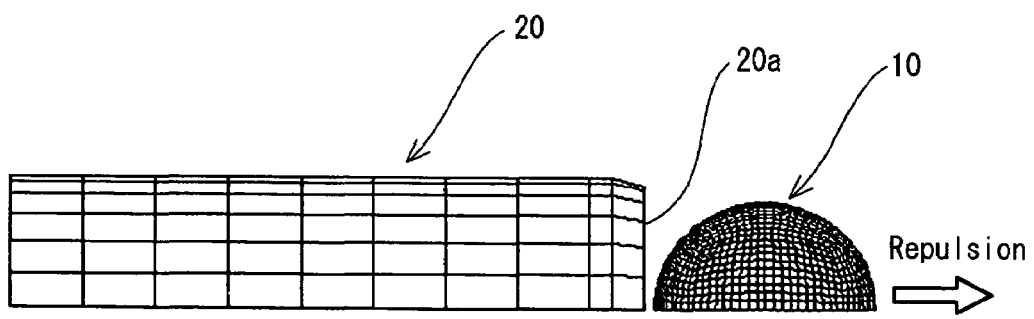
FIG. 4C shows a state after the hollow rod model collides with the golf ball model.

More specifically, as shown in FIGS. 4A, 4B, and 4C, the simulation is executed, assuming that the golf club head (hitting object) collides with the golf ball. That is, the state of the golf ball model 10 at the time when an aluminum hollow rod model 20 having a weight of 50 g (=¼ of 200 g which is the weight of the golf club head) collides with the golf ball model 10 at a speed of 45 m/s is analyzed by using the finite element method. Thereby the amount of a strain generated in each element 11 of the golf ball model 10 at predetermined times is computed. A circular surface 20a of the aluminum hollow rod model 20 collides with the golf ball model 10. The circular flat surface 20a of the hollow rod model 20 collides head-on with the golf ball model 10. A central point 20b of the circular surface 20a of the cylindrical hollow rod model 20 collides first with the golf ball model 10.

In the case where the golf ball model is bilaterally symmetrical, half of the golf ball model may be analyzed in its dynamic behavior. In the case where the golf ball model is bilaterally and vertically symmetrical, it is possible to use a model having a volume ¼ of the volume of the golf ball model 10. The model is formed by cutting the golf ball model 10 at the central face thereof in horizontal and vertical directions. By considering the symmetrical property of the model, the analysis of the dynamic behavior of the entire model can be efficiently accomplished by analyzing a smaller region thereof without deteriorating analysis accuracy.

At step 2, initially, from the result obtained by the simulation which is executed by the analysis using the finite element method, computations are performed to obtain the strain and the strain component to which each element 11 of the golf ball model 10 is subjected owing to the collision between the golf ball model 10 and the hitting object (hollow rod model 20 made of aluminum) and the modulus of elasticity, the viscous drag, the strain speed, and the data of the coordinate value of the nodal point 12 of each element 11.

Thereafter from the computed value, the value of the stress and strain of each element 11 are momently computed for the following six components described below. The strain and stress of each element 11 are constituted of three components in a vertical direction and three components in a shear direction respectively. Therefore the value of the stress and strain of each element 11 is computed for the six components.

At step 3, the dynamic behavior of the object composed of the viscoelastic material is analyzed by a numerical analysis method to compute the energy loss of the viscoelastic material every moment by means of the viscous component of the to-be-analyzed object while it makes the dynamic behavior.

Initially, using the stress value and the strain value of each of the six components of each element computed momently at step 2, the relationship between the stress and the strain is shown in a graph.

Figure 5:
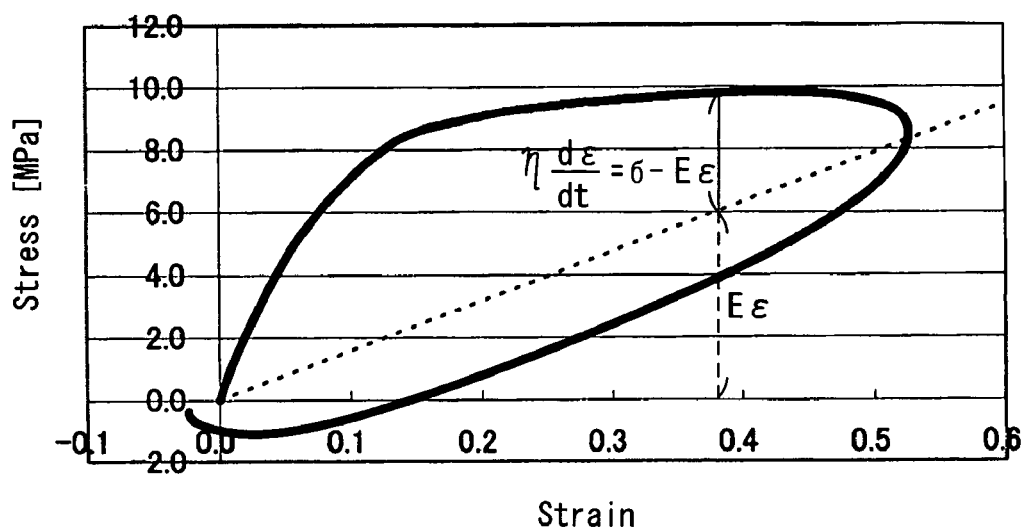
FIG. 5 shows the relationship between a stress and a strain of one component of one element in the golf ball model, thus explaining the value of a stress generated at a given time by a viscous component.

That is, in the simulation which is executed by the analysis using the finite element method, each component of each element 11 constituting the golf ball model 10 shows the relationship (stress-strain curve) between the strain and the stress, as shown in FIG. 5 during the time period in which the hitting object (cylindrical hollow rod model 20 made of aluminum) collides with the golf ball model 10, and the material of the golf ball model 10 is subjected to the stress, generates the strain, and returns to its original state. In FIG. 5 showing the relationship between the strain and the stress of one component of one element of the golf ball model 10, the abscissa indicates the strain, whereas the ordinate indicates the stress.

At a given time at which the value of a strain is shown in FIG. 5, as described above, the value of the stress is expressed as $\sigma = E\epsilon + \eta(d\epsilon/dt)$. That is, the stress is divided into the stress generated by the viscous component and the stress generated by the elastic component. By using $\eta(d\epsilon/dt)$ expressing the stress generated by the viscous component, the energy loss is computed. That is, the value of the stress generated by the viscosity is found from the viscous drag $\eta$ of the viscous component of the viscoelastic material and the strain speed $(d\epsilon/dt)$ of the viscoelastic material when the viscoelastic material makes the dynamic behavior. Similarly by using value of the stress generated by the viscosity of the to-be-analyzed object when the viscoelastic material makes the dynamic behavior at a different time, the energy loss can be computed every moment.

The energy loss of each component of each element 11 at a given time can be computed from the product of the value of the stress generated by the viscosity and the volume V of each element 11 in its initial configuration. The value of the energy loss is present in each of the six components. Thus the value of the energy loss is computed in each of the six components by using a method similar to the above-described method. The total of the values of the energy losses is the value of the energy loss at the given time.

At step 4, the energy loss value of the viscoelastic material at the given time is computed per unit volume of each element 11 included in the golf ball model. The energy loss value obtained by the computation is inputted to the visualizing software so that the visualizing software visualizes the energy loss of the golf ball model at the given time. The method of visualizing the energy loss is described below.

The energy loss value of each element 11 at the given time computed at step 3 is inputted to the visualizing software.

Figure 6:
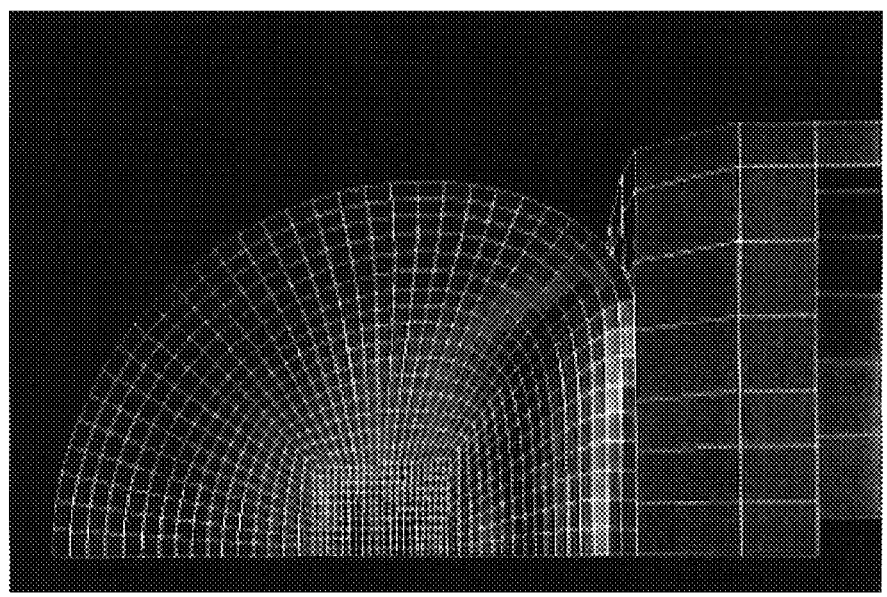
FIG. 6 shows a state in which an energy loss of each element of the golf ball model generated at a given time in a collision between the golf ball model and a hitting object is visualized.

Thereafter the energy loss of each element of the golf ball model 10 at the given time when the golf ball model 10 makes a deformation behavior is shown in a contour view (sectional view) of FIG. 6 to visualize the energy loss generated inside the golf ball model 10 at the given time.

More specifically, FIG. 6 shows the state inside the golf ball in which display regions are set in dependence on energy loss values. For example, a region having the greatest energy loss value is displayed in red, and a region having the smallest energy loss value is displayed in blue. Other regions having different energy losses are also displayed in FIG. 6 sequentially (regions red> . . . yellow> . . . >green> . . . blue).

Based on the data of the coordinate values of the nodal points 12 of each element 11 obtained by the analysis, a deformed configuration of the golf ball model 10 is also displayed to visualize the configuration thereof at a given time in the collision between the hitting object and the golf ball model 10.

The method of the present invention is capable of estimating and observing a portion inside the golf ball in which the energy loss has been generated at the given time in the collision between the hitting object and the golf ball and also the extent of the generated energy loss. The method of the present invention is also capable of estimating a deformed configuration of the golf ball at the given time.

The method of the present invention is also capable of separately computing the energy loss of the viscoelastic material in a state in which it has deformed and does not return to its original state, the energy loss thereof at regular intervals in the course of the deformation thereof, and the energy loss thereof at a moment. Therefore the method of the present invention is capable of computing the energy loss in various conditions such as the energy loss at an impact time and the energy loss in the time period from the impact time till the time when the golf ball separates from the hitting object.

In visualizing the energy loss, it is optimum to realize the visualization of the energy loss by classifying energy loss values of each element by colors and displaying the difference in the energy loss values in colors in the contour view. For example, it is possible to evaluate the magnitude of each energy loss at a glance by displaying the energy of each element by colors, as shown in FIG. 6. It is possible to appropriately set the number of display regions to be displayed and the range of the energy loss value in each region.

In the embodiment, one-piece golf ball model is simulated. In addition, the method of the present invention is capable of simulating a two-piece golf ball and a multi-piece golf ball composed of three or more layers. The method of the present invention is also capable of simulating the golf ball made of any kind of materials, provided that the property of the material can be measured. The dynamic behavior may be analyzed by numerical analysis methods other than the finite element method. The method of the present invention is also capable of outputting coordinate values of the nodal points necessary for conversion of the coordinate value of the element and computing the value of the stress and strain of each of six components of each element every moment in an element coordinate system.

EXAMPLE 1

A mixture containing urethane as its main component was molded at 160° C. for 30 minutes to form a golf ball model of the example 1 as a one-piece ball having a diameter of 42.8 mm.

The properties (Young's modulus and loss coefficient) of the material containing urethane as its main component were measured (room temperature: 23° C., relative humidity: 50%, collision speed of hitting rod: 25 m/s) by the split Hopkinson rod tester which will be described later. Results of the measurement were that the value of the Young's modulus was 28.85 MPa, the value of the loss coefficient was 1.16, the value of the maximum compression strain was 0.445, and the value of the maximum strain speed was 4874.3 (/s).

Figure 1:
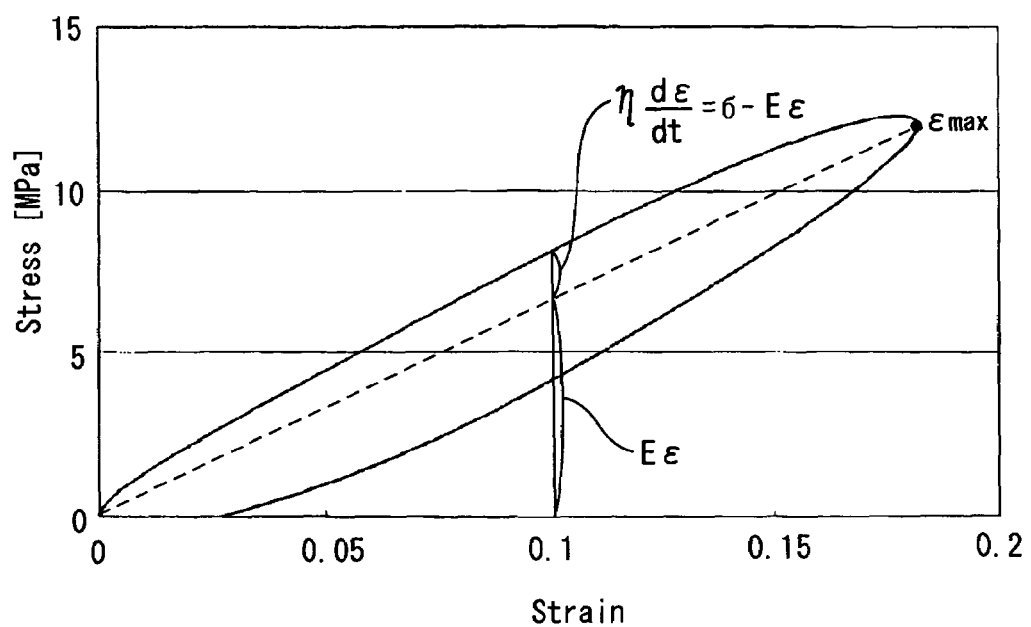
FIG. 1 shows a stress-strain curve, explaining the value of a stress generated by a viscous component when a viscoelastic material makes a dynamic deformation behavior.
Figure 2:
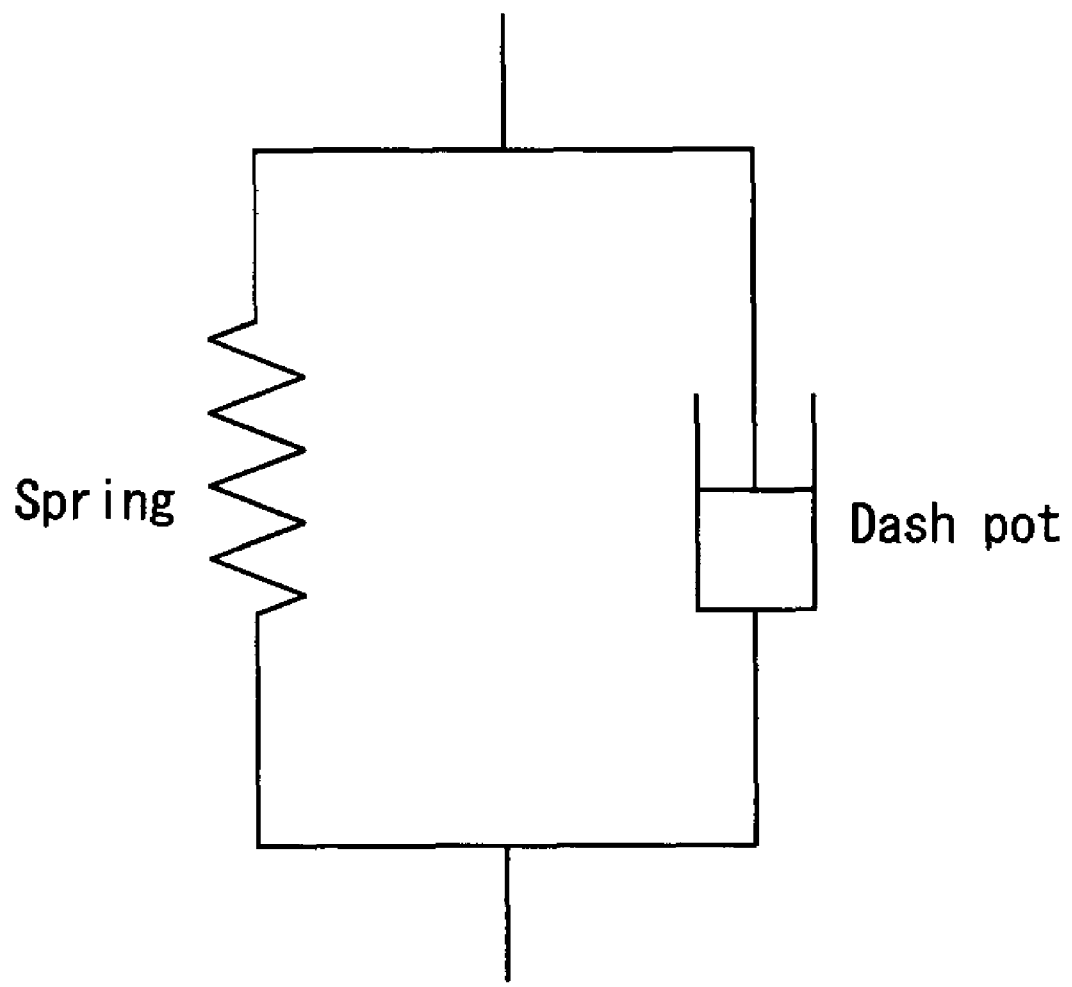
FIG. 2 shows a two-element Voigt model that is used as a viscoelastic model.
Figure 7:
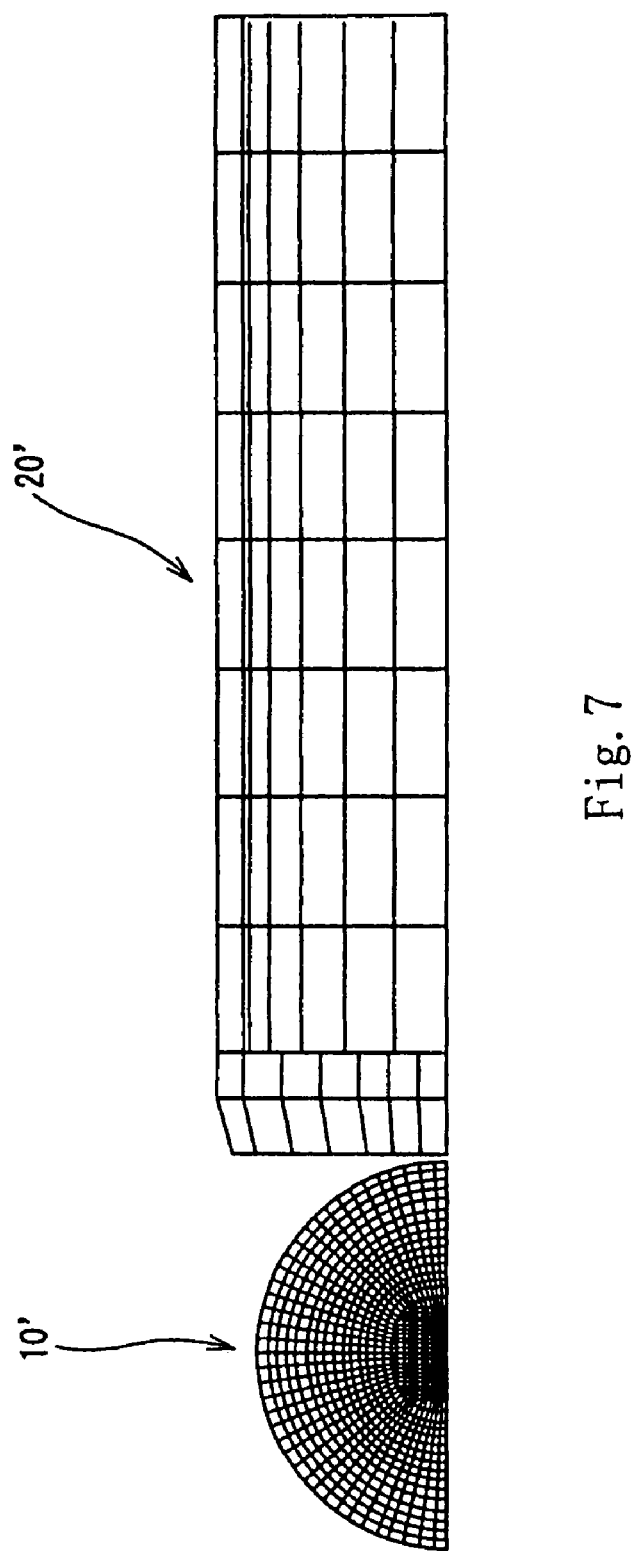
FIG. 7 shows an example 1 in which the golf ball model and a hitting object made of aluminum collides with each other.

By using a method similar to that of the above-described embodiment, the golf ball model used in the example 1 was composed of the viscoelastic material (modulus E of elasticity E of elastic component:1.61(kgf/mm$^2$), viscous drag of viscous component:0.00019) modeled with the two-element material shown in FIG. 2. An energy loss at a given time in the collision (initial speed: 45 m/s) between an aluminum hollow rod model 20' and a golf ball model 10' was computed, as shown in FIG. 7. The golf ball model 10' had 12797 nodal points and was divided into 116000 elements. The element was a hexahedron. The dimension of each element was 0.5 mm to 1.69 mm. The volume of each element was 0.125 mm$^3$ to 2.73 mm$^3$. A stress-strain curve of one of the elements of the golf ball model 10' in one direction was obtained to compute the value of a stress generated by viscosity.

By using a method similar to that of the above-described method, the value of the stress generated by the viscosity was computed in the other five directions to find the total of the values of the stress generated by the viscosity in the six directions. The total of the values of the stress generated by the viscosity in the six directions was multiplied by the volume $1.15 \times 10^{-9}$ m$^3$ of the element to obtain $5.084 \times 10^{-3}$ N·m as the energy loss of one element.

Figure 8:
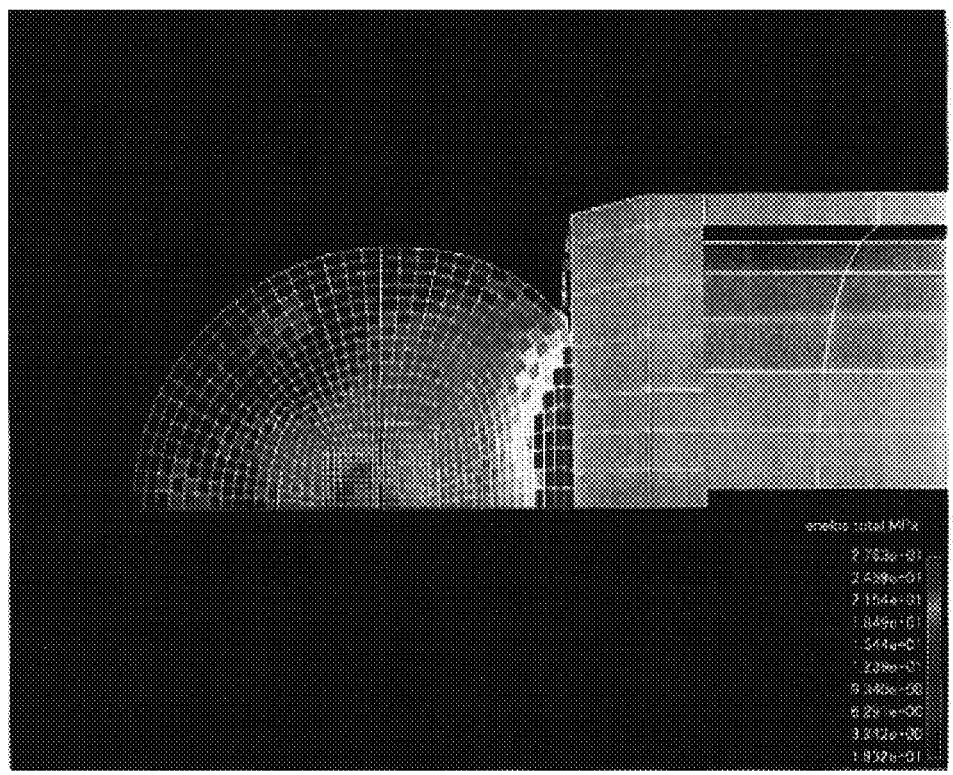
FIG. 8 shows an example 1 in which an energy loss of each element of the golf ball model generated at a given time in a collision between the golf ball model and the hitting object is visualized.
Figure 9:
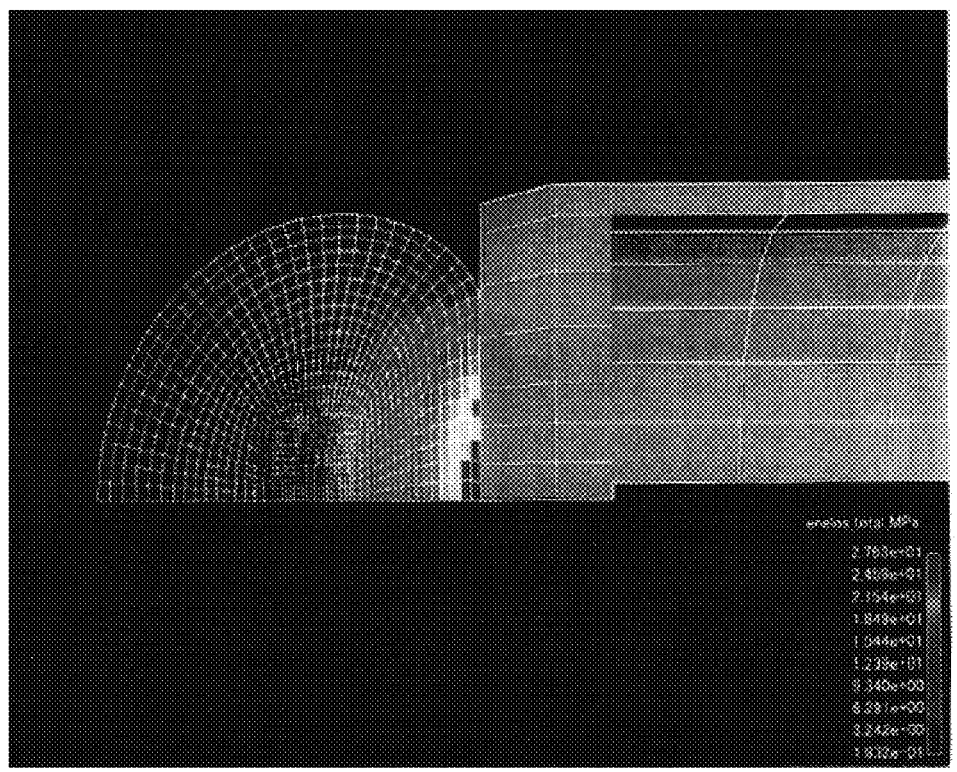
FIG. 9 shows a state in which an energy loss at a certain time after the state of FIG. 8 is visualized.
Figure 10:
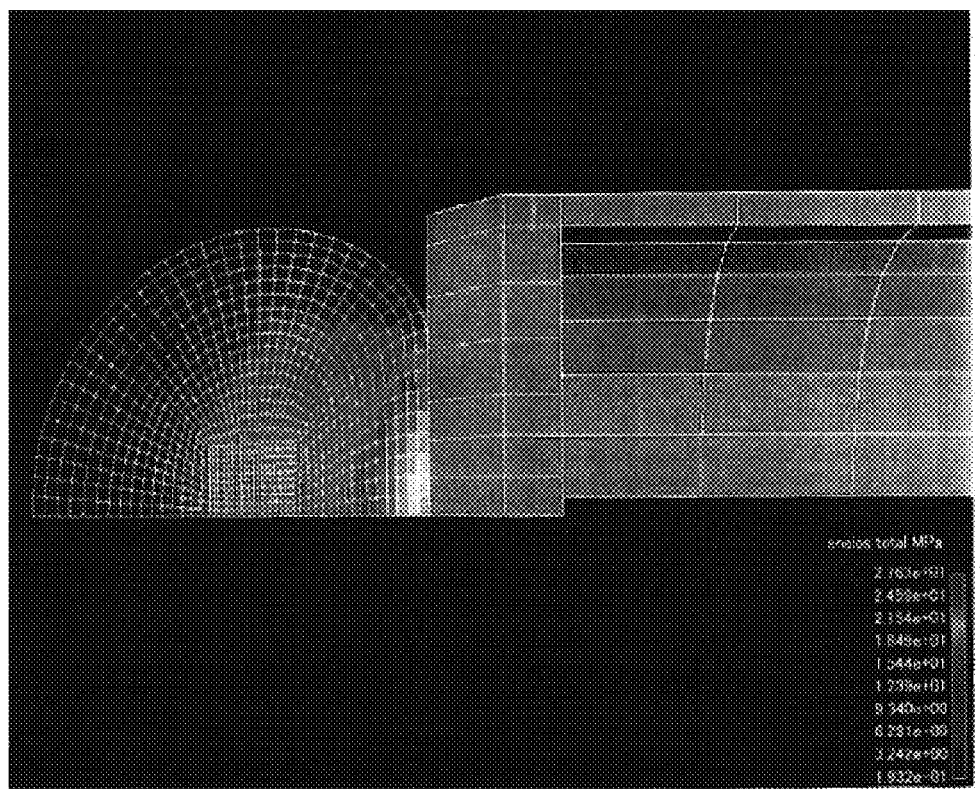
FIG. 10 shows a state in which an energy loss at a certain time after the state of FIG. 9 is visualized.

Similar computations were performed for all elements constituting the golf ball model to visualize an energy value at a given time per unit volume in contour views shown in FIGS. 8, 9, and 10. The relationship between energy values (MPa) and colors corresponding thereto are shown at CONTOUR-LEVEL shown in FIGS. 8, 9, and 10. A portion where the energy loss value was not less than 21.54 MPa at the given time was displayed in red, whereas a portion where the energy loss value of the element was small was displayed in blue. Thereby it was possible to confirm that the portion of the golf ball where the energy loss was greatest at the given time after the collision can be determined at a glance.

The reason a plurality of colors are present for one element in the contour view is because energy loss values of the element are distributed to nodal points, and the values of adjacent elements are added thereto.

More specifically, FIG. 8 shows a state about $1.4 \times 10^{-4}$ seconds after the collision. FIG. 9 shows a state, about $3.2 \times 10^{-4}$ seconds after the collision, in which the deformation of the golf ball model has proceeded. FIG. 10 shows a state, about $4.6 \times 10^{-4}$ seconds after the collision, in which the golf ball model has returned to its original state. It is possible to compute energy losses at other times and observe the states of the energy losses at regular intervals.

Measurement of Properties of Material Conducted by Split Hopkinson Rod Tester

Figure 11:
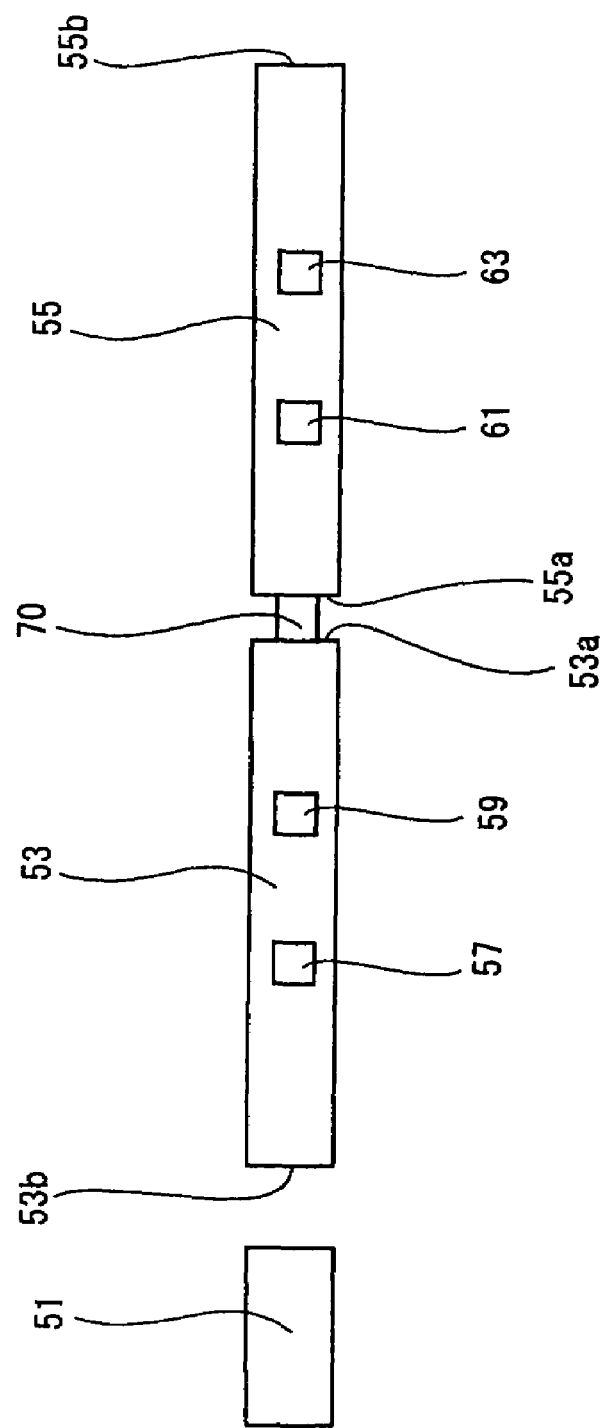
FIG. 11 is an illustrative front view showing a split Hopkinson rod tester that measures properties of a material such as the Young's modulus and loss coefficient thereof.

FIG. 11 is an illustrative front view showing a split Hopkinson rod tester for measuring properties (Young's modulus, loss coefficient, etc.) of a material necessary for executing an analysis using the finite element method in carrying out the energy loss evaluation method of the of the present invention.

The split Hopkinson rod tester shown in FIG. 11 has a hitting rod 51, an input rod 53, and an output rod 55. These rods are arranged linearly. A first strain gauge 57 and a second strain gauge 59 are installed on the input rod 53. A third strain gauge 61 and a fourth strain gauge 63 are installed on the output rod 55. A columnar specimen 70 is sandwiched between a rear end 53a of the input rod 53 and a front end 55a of the output rod 55.

The specimen 70 may be formed by molding a material consisting of a rubber composition to be used for the golf ball into a predetermined configuration thereof or cutting a spherically formed golf ball. In the embodiment, the specimen 70 has a length (distance between the rear end 53a of the input rod 53 and the front end 55a of the output rod 55) of 4 mm and a sectional diameter of 18 mm.

The hitting rod 51, the input rod 53, and the output rod 55 are cylindrical and made of polymethyl methacrylate. The sectional diameter of each of the first rod 53 and the output rod 55 is set to 20 mm. The modulus of direct elasticity of each of the first rod 3 and the output rod 55 is set to 5300 Mpa. The specific gravity of each of the first rod 3 and the output rod 55 is set to 1.19. The length of the hitting rod 51 is set to 100 mm. The length of each of the input rod 53 and the output rod 55 (hereinafter may be referred to as stress rod) is set to 2000 mm.

The first strain gauge 57 is installed on the input rod 53 at a position spaced 900 mm from the rear end 53a thereof. The second strain gauge 59 is installed on the input rod 53 at a position spaced 600 mm from the rear end 53a thereof. The third strain gauge 61 is installed on the output rod 55 at a position spaced 300 mm from the front end 55a thereof. The fourth strain gauge 63 is installed on the output rod 55 at a position spaced 600 mm from the front end 55a thereof.

In the split Hopkinson rod tester shown in FIG. 11, the hitting rod 51, the input rod 53, and the output rod 55 are made of synthetic resin consisting of polymethyl methacrylate. The input rod 53 and the output rod 55 are as long as 2000 mm. The distance between the first strain gauge 57 and the rear end 53a of the input rod 53 is long. The distance between the second strain gauge 59 and the rear end 53a of the input rod 53 is also long. Therefore, the split Hopkinson rod tester is suitable for measuring the strain, the strain speed, and the stress of a viscoelastic material such as crosslinked rubber which is used for a golf ball.

A monoaxial strain gauge for plastic is used as the first strain gauge 57, the second strain gauge 59, the third strain gauge 61, and the fourth strain gauge 63. In the embodiment, a monoaxial strain gauge manufactured by Kyowa Dengyo Kabushiki Kaisha is used. The monoaxial strain gauge is bonded to the above-described positions of the input rod 53 and the output rod 55. The first strain gauge 57 through the fourth strain gauge 63 are installed on the input rod 53 and the output rod 55 linearly in the longitudinal direction thereof.

In measuring the property of the material such as Young's modulus and the loss coefficient by the split Hopkinson rod tester, initially, the hitting rod 51 is brought into collision with the front end 53b of the input rod 53 at a speed of 25 m/s. Thereby, an incident distorted wave is generated in the input rod 53. The incident distorted wave advances to the rear end 53a of the input rod 53. A part of the incident distorted wave is reflected from the rear end 53a of the input rod 53 to generate a reflected distorted wave. The reflected distorted wave advance to the front end 53b of the input rod 53. A part of the incident distorted wave advances to the specimen 70 from the rear end 53a of the input rod 53 and propagates to the output rod 55 to generate a transmitted distorted wave. The transmitted distorted wave advances to the rear end 55b of the output rod 55.

The incident distorted wave is measured with the first strain gauge 57 and the second strain gauge 59. The incident distorted wave is passed through a low-pass filter to remove a high-frequency wave having a frequency more than 10 KHz from the incident distorted wave. Zero compensation is performed to make the base line value of the time history of the incident distorted wave zero. Fourier transformation of an obtained time base strain at each of the first strain gauge 57 and the second strain gauge 59 is performed to determine a frequency axis strain. A transmission function is derived from the frequency axis strain at the first strain gauge 57 and the second strain gauge 59. Based on the transmission function, the frequency axis strain at the rear end 53a of the input rod 53 is estimated in consideration of the ratio of the distance X1 between the first strain gauge 57 and the rear end 53a of the input rod 53 to the distance X2 between the second strain gauge 59 and the rear end 53a of the input rod 53. Fourier inverse transformation of the frequency axis strain is performed to obtain a time base strain (time history of strain) ϵi of the incident distorted wave at the rear end 53a of the input rod 53.

Similarly, the second strain gauge 59 and the first strain gauge 57 measure the reflected distorted wave reflected from the rear end 53a of the input rod 53 and advancing to the front end 53b of the input rod 53. A time base strain (time history of strain) ϵr of the reflected distorted wave at the rear end 53a of the input rod 53 is obtained from the measured reflected distorted wave.

The transmitted distorted wave which propagates to the output rod 55 through the specimen 70 is measured with the third strain gauge 61 and the fourth strain gauge 63 installed on the output rod 55. A time base strain (time history of strain) ϵt of the transmitted distorted wave at the front end 55a of the output rod 55 is obtained from the measured transmitted distorted wave.

From the obtained time base strains ϵi, ϵr, and ϵt, a strain speed ϵ' of the specimen 70 is computed by using an equation (5) shown below.

(Equation 5)

$$\varepsilon' = (C_0/L) \cdot (\varepsilon i - \varepsilon r - \varepsilon t) \quad (5)$$
$$((E/\rho)^{1/2}/L) \cdot (\varepsilon i - \varepsilon r - \varepsilon t)$$

where $C_0$ indicates the propagation speed (m/s) of the strain wave in the stress rod and the output rod, L indicates the length (m) of the specimen, E is the modulus of direct elasticity (N/m$^2$) of the stress rod, and ρ is the density (kg/m$^3$) of the stress rod.

From the time base strains ϵi, ϵr, ϵt, the strain ϵ of the specimen 70 is computed by using an equation (6) shown below.

(Equation 6)

$$\varepsilon = (C_0/L) \cdot \int_0^t (\varepsilon_i - \varepsilon_r - \varepsilon_t) dt \quad (6)$$
$$((E/\rho)^{1/2}/L) \cdot \int_0^t (\varepsilon_i - \varepsilon_r - \varepsilon_t) dt$$

where $C_0$ indicates the propagation speed (m/s) of the strain wave in the stress rod and the output rod, L indicates the length (m) of the specimen, E is the modulus of direct elasticity (N/m$^2$) of the stress rod, and ρ is the density (kg/m$^3$) of the stress rod.

From the time base strains ϵi, ϵr, and ϵt, the stress σ of the specimen 70 is computed by using an equation (7) shown below.

$$\sigma = (E \cdot A/(2As)) \cdot (\varepsilon i + \varepsilon r + \varepsilon t) \quad (7)$$
$$= (E \cdot D^2/(2Ds)^2)) \cdot (\varepsilon i + \varepsilon r + \varepsilon t)$$

where E indicates the modulus of direct elasticity (N/m$^2$) of the stress rod consisting of the input rod and the output rod; A indicates the sectional area (m$^2$) of the stress rod; As indicates the sectional area (m$^2$) of the specimen; D indicates the diameter (m) of the stress rod; and Ds indicates the diameter (m) of the specimen.

Figure 12:
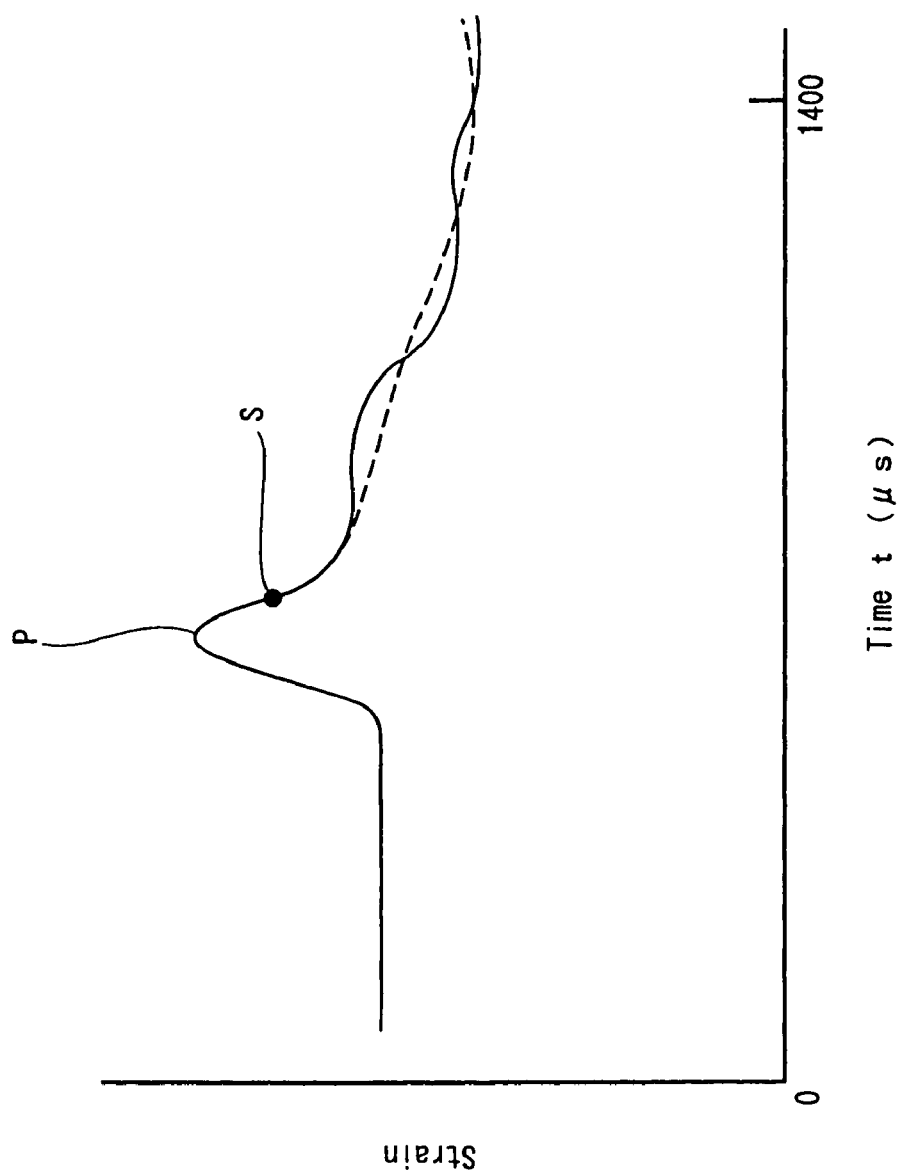
FIG. 12 is a graph showing the state of the time history of a strain of a specimen.

FIG. 12 shows the obtained strain time history of the specimen 70. As shown in FIG. 12, the curve is smooth for a certain period of time after a time corresponding to a peak P. After a time corresponding to a given point of the graph FIG. 12, the curve becomes irregular. A point S is selected in the curve-smooth stage between the peak P and the given point. A tangent to the curve at the point S is drawn. A relaxation time λ is derived from the intersection of the tangent and the time base. A curve found by using an equation (8) shown below is determined as the curve after the point S of FIG. 12. In this manner, the entire strain time history is corrected to a smooth curve (shown with a one-dot line in FIG. 12). Thereby, it is possible to remove the influence of noise on an obtained viscoelastic characteristic value.

(Equation 8)

$$\epsilon(t) = \epsilon 0 \cdot e^{-t/\lambda} \quad (8)$$

where ϵ0 is a strain at the point of contact.

Similarly, it is possible to make an entire stress time history a smooth curve by using an equation (9) shown below. Thereby, it is possible to remove the influence of noise on an obtained property (Young's modulus and loss coefficient) of the material.

(Equation 9)

$$\sigma(t) = \sigma 0 \cdot e^{-t/\lambda} \quad (9)$$

where σ0 is a stress at the point of contact.

Figure 13:
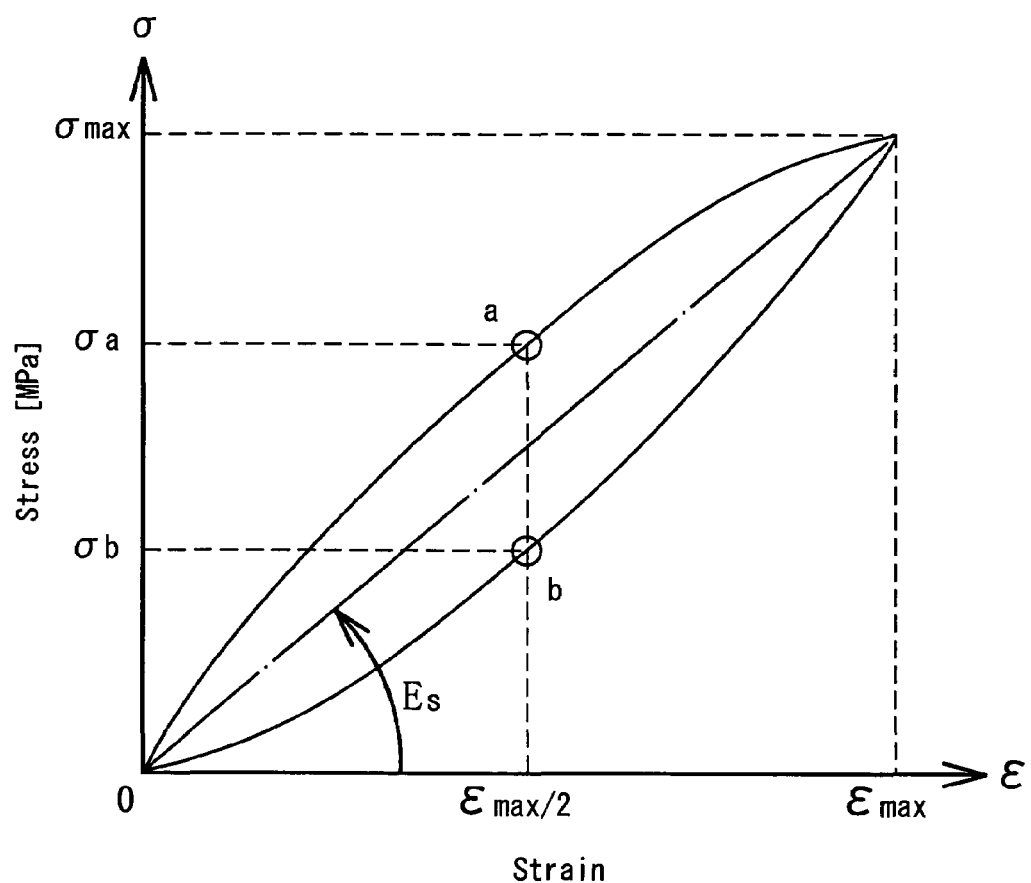
FIG. 13 is a graph showing a stress-strain curve obtained when the properties of a material is measured by the split Hopkinson rod tester.
Figure 14:
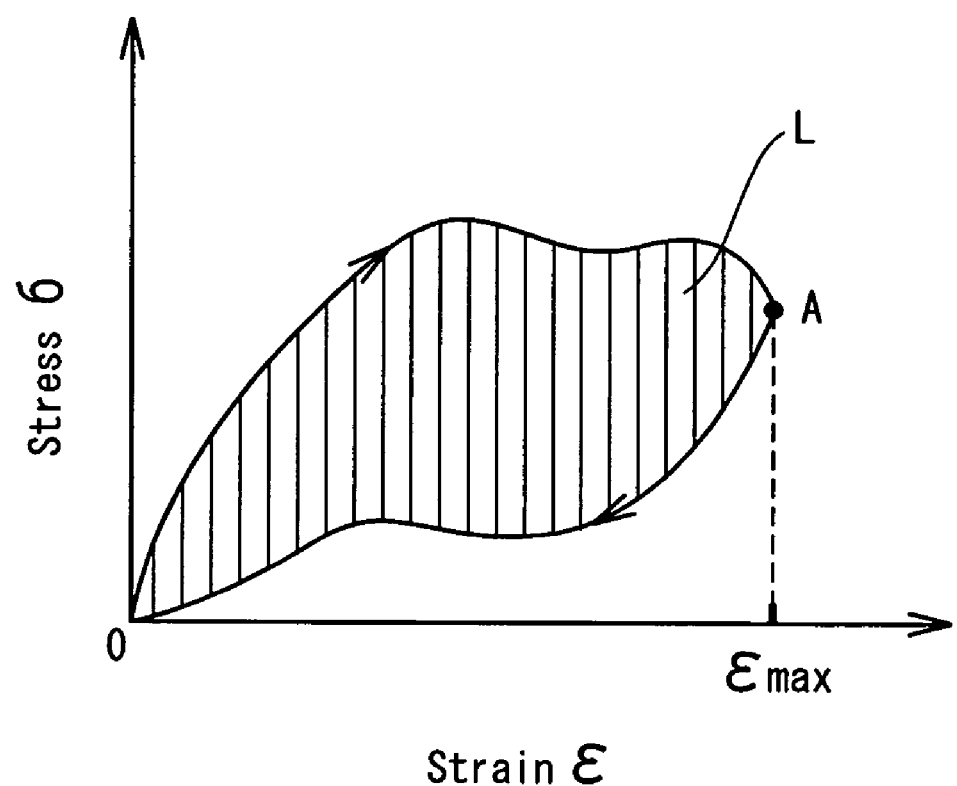
FIG. 14 is an explanatory view of a conventional art, showing the work amount of an entire dynamic deformation behavior.
Figure 15A:
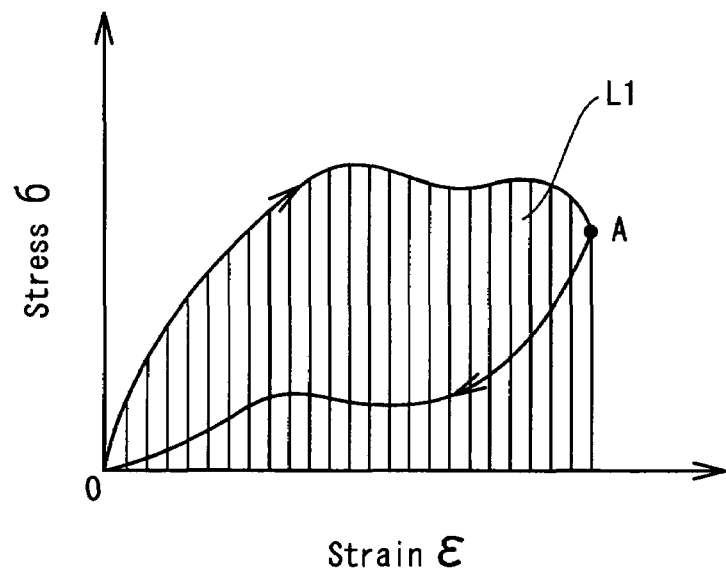
FIGS. 15A and 15B show a conventional method of computing an energy loss.
Figure 15B:
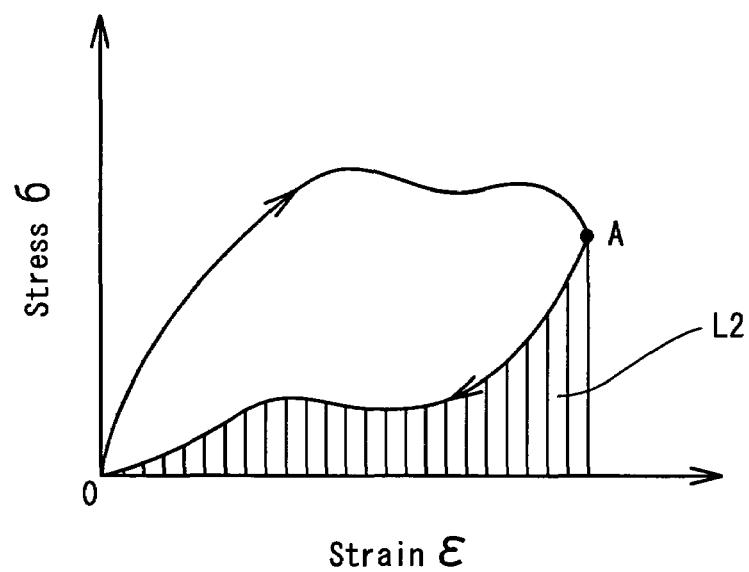

A stress-strain curve is determined from the strain time history and the stress time history of the specimen 70 obtained by performing the above compensation. FIG. 13 is a graph showing a typical stress-strain curve. From the stress-strain curve, the Young's modulus Es of the specimen 70 is computed by using an equation (10) shown below.

(Equation 10)

$$Es = \sigma max/\epsilon max \quad (10)$$

From the stress-strain curve of FIG. 13, a phase angle δ is computed by using an equation (11) shown below:

(Equation 11)

$$\delta = \sin^{-1}((\sigma a - \sigma b)/\sigma max) \quad (11)$$

A loss coefficient (tan δ) is computed from the phase angle δ.

As apparent from the foregoing description, according to the present invention, it is possible to compute the energy loss generated momently in the viscoelastic material, by giving attention to the viscous component of the to-be-analyzed object. Thus in the case where the properties of the viscous component are obtained at a given time by the numerical analysis, it is possible to compute the energy loss generated momently by the dynamic deformation behavior of the to-be-analyzed object without using the above-described stress-strain curve showing the relationship between the stress and the strain from the time when the to-be-analyzed object deforms until the time when it returns to its original state.

Therefore the method of the present invention is capable of separately computing the energy loss in a state in which the viscoelastic material has deformed and does not return to its original state, the energy loss at regular intervals in the course of the deformation, and the energy loss at a moment. Thus the method is useful in analyzing the dynamic deformation behavior of the viscoelastic material and designing the to-be-analyzed object.

It is possible to visualize the transition of the energy loss in correspondence to the dynamic behavior of the to-be-analyzed object by momently computing the value of the stress generated by the viscous component. Thus the method of the present invention is useful in designing and developing industrial products composed of the viscoelastic material having a dynamic behavior. Further since simulations are executed by using the finite element method, it is possible to save time and the expenditure for a trial manufacture and achieve the design of products composed of various materials and having various constructions.

By momently visualizing the energy loss inside the golf ball in the time period from an impact time until a time when the golf ball separates from the golf club head, it is possible to obtain information useful for allowing a player to have a good feeling when the golf club head impacts the golf ball. Thus the method is serviceable for designing the golf ball.

The invention claimed is:

1. A method of computing an energy loss generated in a viscoelastic material, comprising the steps of:
   analyzing a dynamic behavior of an object composed of a viscoelastic material by a numerical analysis method; and
   computing said energy loss of said object momently when said object makes said dynamic behavior by a viscous component of said object,
   wherein the viscoelastic material is a thermoplastic resin, a thermosetting resin, an elastomer, or a rubber composition,
   wherein said numerical analysis method is carried out by an analysis using a finite element method; and said energy loss is computed by using a value of a stress generated by viscosity of said viscoelastic material, when said object makes said dynamic behavior, and
   wherein said value of said stress generated by said viscosity is found by a viscous drag of a viscous component of said viscoelastic material and by a strain speed of said viscoelastic material at a time when said viscoelastic material makes said dynamic behavior.

2. The method according to claim 1, wherein as data of properties of said viscoelastic material that is used to analyze said dynamic behavior of said object, data obtained by measurement performed in conditions where said object is actually used.

3. The method according to claim 1, wherein the object is a golf ball, a rubber roller, a rubber belt, a tire, a sporting good, a golf good, or the sole of a shoe.

4. A method of evaluating an energy loss of a golf ball composed of a viscoelastic material, comprising the steps of:
   analyzing a dynamic behavior of said golf ball in supposition of a collision between a golf club head and said golf ball;
   computing said energy loss generated in said golf ball owing to said collision by using a method of computing an energy loss generated in a viscoelastic material comprising the steps of:
      analyzing a dynamic behavior of an object composed of a viscoelastic material by a numerical analysis method; and computing said energy loss of said object momently when said object makes said dynamic behavior by a viscous component of said object, wherein the viscoelastic material is a thermoplastic resin, a thermosetting resin, an elastomer, or a rubber composition;
   inputting said energy loss to a visualizing software; and
   visualizing said energy loss momently.

* * * * *